United States Patent
Isaksson et al.

(10) Patent No.: US 8,761,093 B2
(45) Date of Patent: Jun. 24, 2014

(54) RATE SHAPING TRIGGERED DISCONTINUOUS TRANSMISSION IN WIRELESS COMMUNICATIONS

(75) Inventors: Martin Isaksson, Stockholm (SE); Mats Jansson, Spanga (SE); Anders Ohlsson, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 267 days.

(21) Appl. No.: 12/795,784

(22) Filed: Jun. 8, 2010

(65) Prior Publication Data

US 2011/0075558 A1    Mar. 31, 2011

Related U.S. Application Data

(60) Provisional application No. 61/245,972, filed on Sep. 25, 2009.

(51) Int. Cl.
*H04W 4/00*    (2009.01)

(52) U.S. Cl.
USPC .......................................................... 370/329

(58) Field of Classification Search
USPC ......... 370/329, 341, 328, 349, 347, 310, 335; 455/452.1, 450
See application file for complete search history.

(56) References Cited

U.S. PATENT DOCUMENTS 7,961,620 B2 *   6/2011   Kim et al. ..................... 370/235
8,098,635 B2 *   1/2012   Montojo et al. .............. 370/335

FOREIGN PATENT DOCUMENTS

| EP | 1986455 A1 | 10/2008 |
|----|------------|---------|
| WO | 2008/054103 A1 | 5/2008 |
| WO | 2008/114977 A1 | 9/2008 |

* cited by examiner

*Primary Examiner* — Chandrahas Patel
(74) *Attorney, Agent, or Firm* — Coats and Bennett, P.L.L.C.

(57) ABSTRACT

A modified token bucket algorithm in a rate shaper in a wireless communication network allows for the "borrowing" of tokens, creating the possibility of a token debt, or a token bucket with a negative Token Bucket Counter (TBC) value. In this modified token bucket algorithm, an incoming packet is passed along so long as the TBC is positive, even if the packet must "borrow" some tokens, driving the TBC negative. Subsequent incoming packets are stalled until the TBC reaches a positive value. The token bucket refills at a known rate; accordingly, the duration of traffic stalling, when the TBC is negative, is known. During this time, the UE is forced into DRX mode, saving battery power by not monitoring DPCCH for traffic that has been halted. The DRX, or sleep, mode may be invoked in several ways.

18 Claims, 9 Drawing Sheets

R/R/E/LCID sub-header

RATE SHAPING TRIGGERED DISCONTINUOUS TRANSMISSION IN WIRELESS COMMUNICATIONS

This application claims priority to U.S. provisional Patent Application No. 61/245,972 filed Sep. 25, 2009, titled "Rate Shaping Triggered Discontinuous Transmission in Wireless Communications," the disclosure of which is incorporated herein by reference in its entirety.

FIELD OF INVENTION

The present invention relates generally to wireless communication networks, and in particular to a system and method of controlling discontinuous transmission by rate shaping.

BACKGROUND

Wireless communication systems are a ubiquitous part of modern life in many areas. A number of different wireless communication protocols have been developed. For example, Long Term Evolution (LTE) is a set of enhancements to the Universal Mobile Telecommunications System (UMTS) that supports high data rates, low latency, low implementation and operating costs, and a seamless connection to legacy wireless communication networks.

As another example, High Speed Packet Access (HSPA) is an extension of wideband CDMA (WCDMA) protocols. HSPA transmits communication data on shared channels, in packets addressed to specific users. HSPA features short Transmission Time Interval (TTI), link adaptation, fast scheduling, fast retransmission and soft-combining, and advanced modulation, resulting in increased data rates, low latency, and increased system capacity.

A limitation common to all wireless communication systems is the limited battery life of mobile terminals, or user equipment (UE). One known method to preserve UE battery life, supported by numerous wireless communication protocols, is Discontinuous Reception (DRX). DRX reduces battery consumption in the UE by allowing the UE to stop monitoring a downlink control channel, such as the Physical Downlink Control Channel (PDCCH). That is, the UE can turn off its receiver during certain time periods. The time periods during which the receiver is turned off are configured by the network. DRX is configured separately—that is, by means of different parameters—for UEs in RRC_IDLE and RRC_CONNECTED mode.

FIG. 1 depicts the basics of DRX. Periodically, the UE has an "on duration," during which time it monitors the system for traffic. Following the "on duration" is an opportunity for DRX—that is, a period during which the UE may be relieved from monitoring the system for traffic, thus reducing power consumption and conserving battery power. At the end of the DRX Cycle, the process repeats with another "on duration" and another opportunity for DRX.

The DRX Command MAC Control Element is specified in the 3GPP Technical Specification 36.321, "MAC Protocol specification," the disclosure of which is incorporated herein by reference in its entirety. The DRX Command MAC Control Element can be used to force the UE into DRX sleep mode. If a DRX Command MAC control element is received, both the On Duration Timer and the DRX Inactivity Timer shall be stopped. Furthermore, upon reception of a DRX Command MAC Control Element the DRX Short Cycle Timer shall be started/restarted and the short DRX cycle should be run if configured. The MAC Subheader is depicted in FIG. 2.

An inactivity timer specifies the number of consecutive downlink subframes during which the UE shall monitor the PDCCH after successfully decoding a PDCCH indicating an initial UL or DL user data transmission for this UE.

The DRX Short Cycle Timer parameter specifies the number of consecutive subframes the UE shall follow the short DRX cycle after the DRX Inactivity Timer has expired. FIG. 3 depicts these relationships. If the UE has decoded a PDCCH indicating new transmission during its "on duration," the inactivity timer will keep the UE from sleeping after sending uplink (UL) data—that is, it will prevent the UE from stopping its monitoring of PDCCH. After the inactivity timer has expired the Short Cycle Timer is started. The Short Cycle Timer allows up to five Short Cycles, during which the UE may again monitor the PDCCH.

The process of delaying packets in a traffic stream to cause the traffic to conform to some defined profile is called rate shaping or traffic shaping. Rate shaping may be applied, for example, to smooth out traffic in time entering a network. In the enhanced NodeB (eNodeB) of LTE, rate shaping is applied to a number of bearers, effectively shaping on an aggregate bitrate.

A known rate shaping algorithm is the so-called token bucket algorithm, described in Annex B of the 3GPP Technical Standard 23.107, "Quality of Service (QoS) concept and architecture," incorporated herein by reference in its entirety. The basis for this algorithm is an analogy to a bucket of fixed size, into which tokens, representing an allowed data volume, are injected at a constant rage. These tokens accumulate in the bucket, and the maximum allowed number of tokens is defined by the bucket size. The tokens are consumed by the data packets transmitted. Accordingly, if there are at least as many tokens in the bucket as the packet size, then the packet may be transmitted. Conversely, if the packet size is larger than the number of tokens currently in the bucket, the packet is delayed until sufficient tokens accumulate in the bucket. The parameters defining the token bucket are the token rate, r, and the bucket size, b. A token bucket counter (TBC) variable is used to hold the current number of tokens in the bucket. The token rate corresponds to the maximum or guaranteed bit rate and the bucket size corresponds to the bounded burst size. Data is conformant if the data sent in an arbitrary time period, T, does not exceed $b+rT$.

FIG. 4 depicts a visualization of the conventional token bucket algorithm applied to rate control over several bearers. At most b tokens can be stored in the bucket and the resulting rate, R, is on average the token rate, r.

FIG. 5 depicts the operation of the token bucket algorithm. Initially, the bucket is assumed full, with TBC=b. A first packet, of length $l_1$, is conformant (sufficient tokens are in the bucket), and it is passed to the wireless network for transmission. The bucket fills at a constant rate over the next interval $\Delta t = t_2 - t_1$, until a second packet, of length $l_2$, arrives. The second packet is also conformant (it is smaller than the number of tokens in the bucket, or $l_2 <$ TBC), and the packet is passed by the rate shaper. A third packet arrives, of length $l_3$, when the bucket contains just enough tokens to pass it as well—completely or nearly depleting the bucket (TBC at or near 0). A fourth packet, of length $l_4$, arrives at time $t_4$, before the bucket has been sufficiently replenished with tokens. The fourth packet is delayed by the rate shaper until TBC$>=l_4$, indicated in FIG. 5 as "Packet delay."

SUMMARY

According to one or more embodiments described and claimed herein, a modified token bucket rate shaping algorithm creates known durations during which not traffic is passed; during these times, a UE may be safely forced in to DRX mode to conserve battery power. The modified token bucket algorithm allows for the "borrowing" of tokens, creating the possibility of a token debt, or a token bucket with a negative TBC value. In this modified token bucket algorithm, an incoming packet is passed along so long as the TBC is positive, even if the packet must "borrow" some tokens, driving the TBC negative. Subsequent incoming packets are stalled until the TBC reaches a positive value. The token bucket refills at a known rate; accordingly, the duration of traffic stalling is known. During this time of stalled traffic, the UE is forced into DRX mode, saving battery power by not monitoring DPCCH for traffic that has been halted. The DRX, or sleep, mode may be invoked in several ways.

One embodiment relates to a method of controlling DRX in UE based on rate shaping by a wireless communication network. Traffic transmitted by the network is rate shaped using a modified token bucket rate shaping algorithm comprising by maintaining a token bucket counter (TBC) representing the number of tokens in a bucket; decreasing the TBC by the size of each packet passed for transmission by the network; increasing the TBC at a constant token rate; if the TBC is positive, passing a data packet for transmission by the network; and if the TBC is negative, withholding a data packet from transmission by the network. If the TBC is negative, a UE is directed to enter a DRX mode in which the UE does not monitor a downlink control channel for downlink traffic.

Another embodiment relates to a wireless communication network. The network includes a rate shaper operative to limit data transmitted by the network using a modified token bucket rate shaping algorithm. The algorithm includes maintaining a token bucket counter (TBC) representing the number of tokens in a bucket; decreasing the TBC by the size of each packet passed for transmission by the network; increasing the TBC at a constant token rate; if the TBC is positive, passing a data packet for transmission by the network; and if the TBC is negative, withholding a data packet from transmission by the network. The network further includes a controller operative to direct a UE to enter a DRX mode in which the UE does not monitor a downlink control channel for downlink traffic if the TBC is negative.

DETAILED DESCRIPTION

In a modified token bucket algorithm that introduces token borrowing, a packet is allowed to create a token debt, resulting in a negative TBC. After creating such a token debt, the modified algorithm will not pass any further packets until the TBC has resumed a positive value. Thus, the borrowing will create a delay before the next transmission is allowed, during which a UE is directed to assume DRX mode. The lower bound on the TBC is $-c$ so that the TBC is within the range $[-c,b]$. In some embodiments, the TBC may also be bounded by the available radio channel.

In an exemplary embodiment, the TBC is increased by r in each unit time up to the bucket size, b. In another embodiment, the TBC is increased by $\Delta t \cdot r$ where $\Delta t$ is the time difference between the current time and the previous update of the TBC.

When the $l^{th}$ packet with length $l_i$ arrives, the modified algorithm checks if the TBC value is equal or greater than zero. If so, then traffic is conformant and TBC is decreased by $l_i$ (even if TBC $<l_i$). If the TBC is less than zero, the packet is delayed until the TBC is equal or greater than zero.

Figure 6:
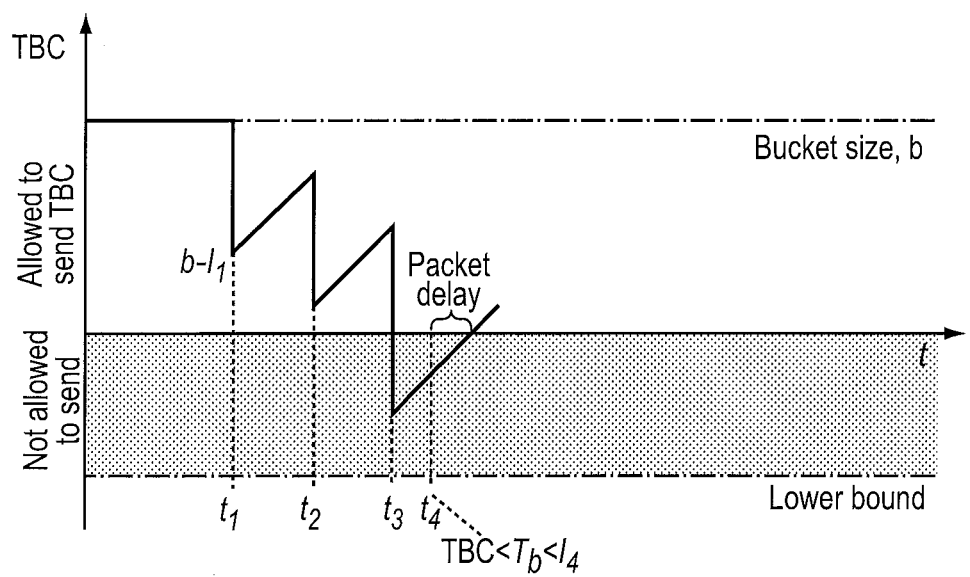
FIG. 6 is a graph depicting the operation of a modified token bucket algorithm with token debt, in a rate shaper.

The operation of this modified token bucket algorithm is depicted in FIG. 6. Four packets with lengths $l_1, l_2, l_3$, and $l_4$ arrive, of which the first two are conformant and therefore processed immediately, as in the conventional token bucket algorithm. The third is conformant under the modified token bucket algorithm, but it makes the TBC go below zero. When the fourth packet arrives at $t_4$, TBC $<0$, so the packet is delayed until the TBC is greater than zero, as indicated in FIG. 6 by the "Packet delay" duration.

In the modified token bucket algorithm, the maximum number of tokens, b, is determined by the parameter bucketTime [s] so that b=r·bucketTime. The parameter bucketTime corresponds to the time it is possible to save tokens to be consumed in a burst which does not cause any debt. In other words, a rate shaper employing the modified token bucket algorithm allows data bursts that comprise as much data as what may be sent in steady state with a constant rate, r, for the duration of $$\frac{b+c}{r}.$$

Figure 7:
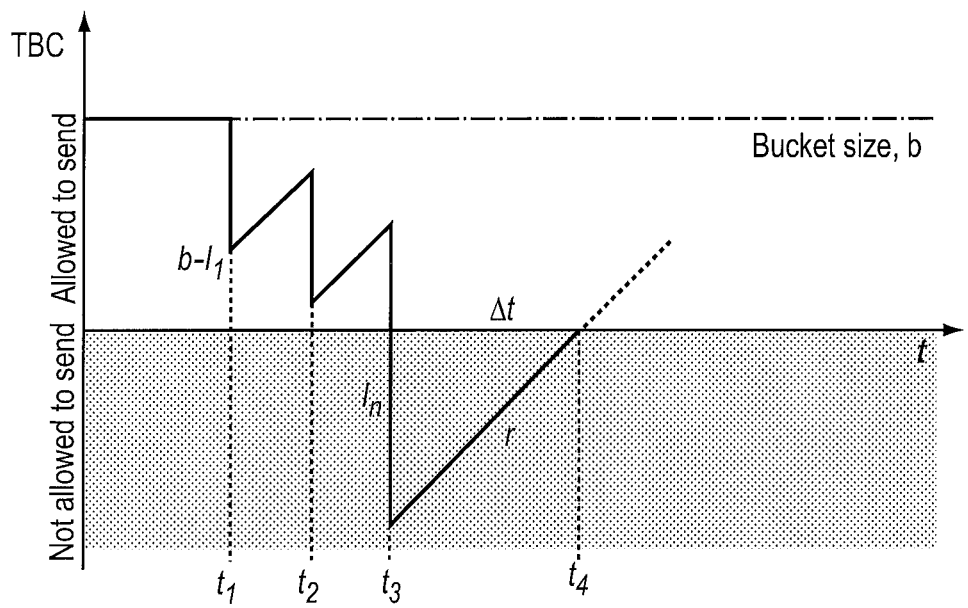
FIG. 7 is graph depicting the delay in packet throughput when tokens are borrowed in a modified token bucket algorithm.

FIG. 7 depicts the delay imposed by the rate shaper due to a negative TBC in the modified token bucket algorithm. If the TBC becomes negative due to a large packet, then the UE cannot send or receive any data during a time period $\Delta t$. Since tokens are refilled at a token rate, r, the time is defined by the number of borrowed tokens divided by the token rate. During the time $\Delta t$ that the modified token bucket algorithm denies scheduling of the UE, the UE wastes battery power monitoring PDCCH while waiting for new data.

According to embodiments of the present invention, a DRX, or sleep period is triggered for a UE when the rate shaping algorithm imposes periods of inactivity. As depicted in FIG. 7, if the TBC becomes negative then the system cannot send, and the UE cannot receive, data during a time period Δt. Since tokens are refilled with a token rate, r, the time is defined by the number of borrowed tokens divided by the token rate. During this time period the UE will not be scheduled, and is therefore forced into DRX mode, so that it does not waste battery power monitoring the PDCCH. The time the UE should sleep is at most Δt.

Figure 8:
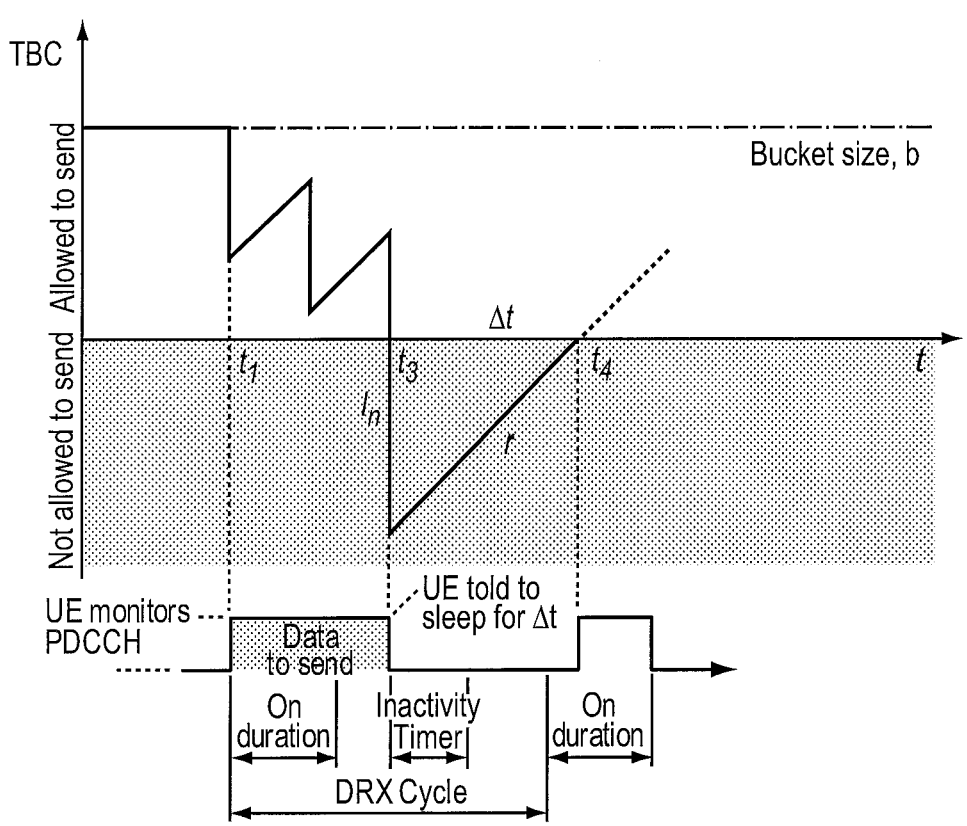
FIG. 8 depicts the relationship between the modified token bucket algorithm operation and DRX operation according to a first embodiment.

In a first embodiment, as depicted in FIG. 8, the UE is forced to sleep for Δt using a modified MAC Control Element. The modification includes adding a field for the DRX duration $\Delta t = t_4 - t_3$. This could occur within an "on" duration. As shown, the UE is forced to sleep for part of the second "on" duration. This embodiment yields maximum conservation of UE battery power, but requires modification of the system standards to include the Δt field in the MAC Control Element.

Figure 9:
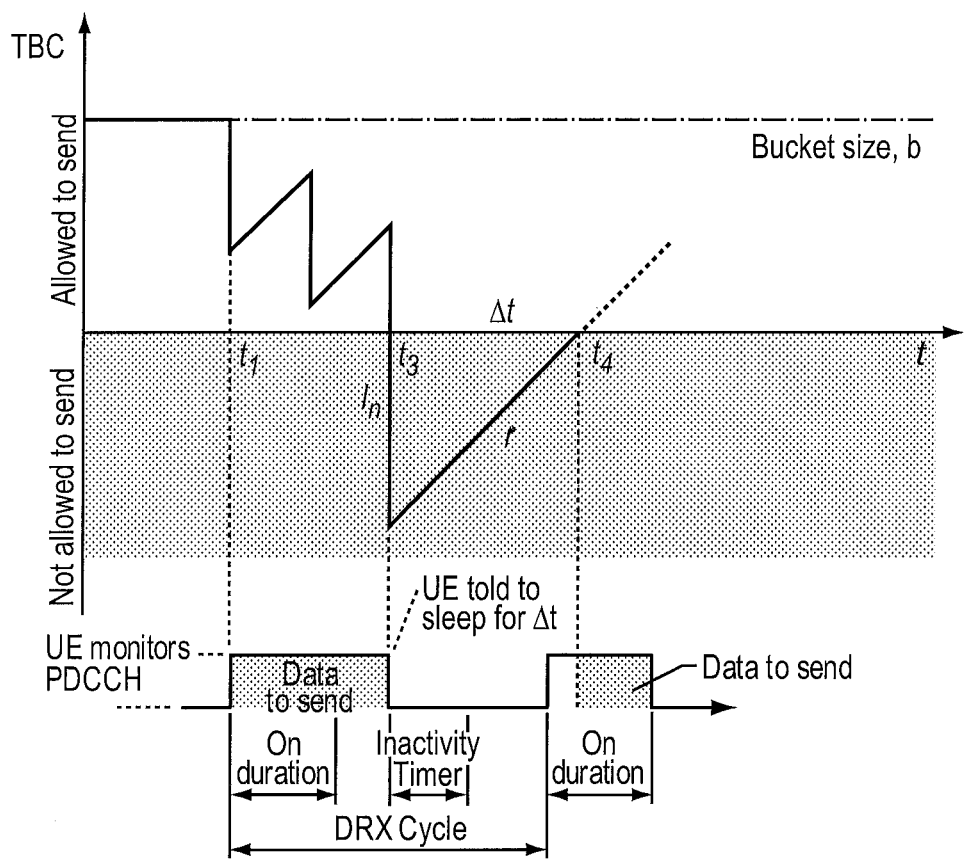
FIG. 9 depicts the relationship between the modified token bucket algorithm operation and DRX operation according to a second embodiment.

In a second embodiment, as depicted in FIG. 9, the UE is forced to sleep only until the next "on" duration (DRX long cycle) using the MAC Control Element. In this embodiment, the DRX rhythm is not disturbed. In this embodiment, note that the UE is active for the entire second "on" duration, but cannot receive data for the first part of it (until Δt expires and the TBC>=0).

Figure 10:
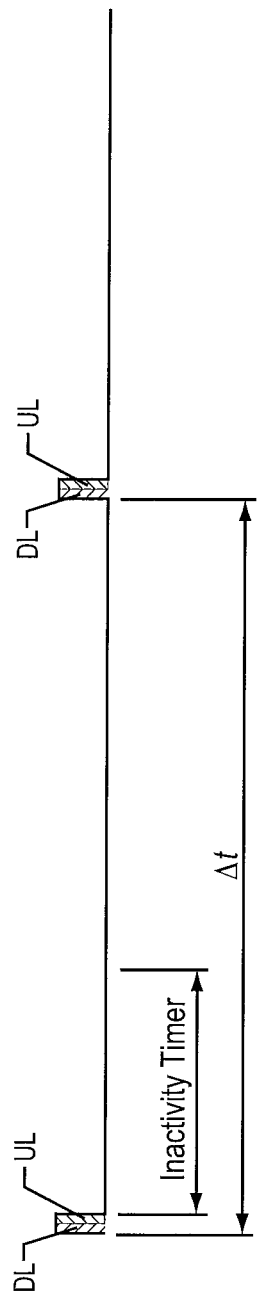
FIG. 10 is a timing diagram depicting DRX operation according to a third embodiment.
Figure 11:
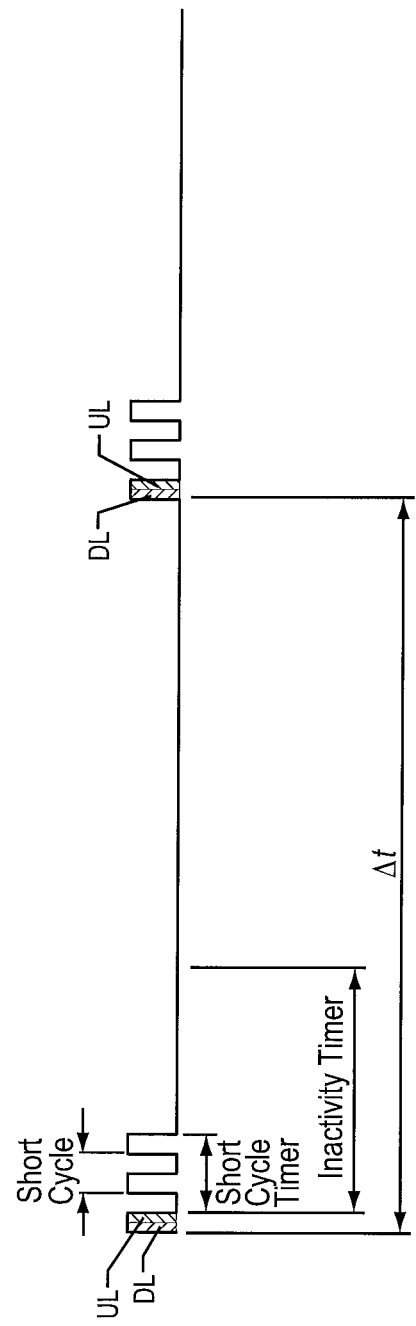
FIG. 11 is a timing diagram depicting DRX operation according to an embodiment that does not require alteration of wireless communication protocol standards.

In a third embodiment, as depicted in FIG. 10, the UE is forced to sleep several DRX long cycles using a modified MAC Control Element. The modified MAC Control Element contains the number of DRX cycles to skip. Alternatively, as depicted in FIG. 11, the UE sleep period can be triggered at each "on" duration with an unmodified MAC Control Element. In both cases, the UE is depicted transmitting uplink (UL) data immediately after receiving the downlink (DL) data that triggers the token bucket debt.

Figure 12:
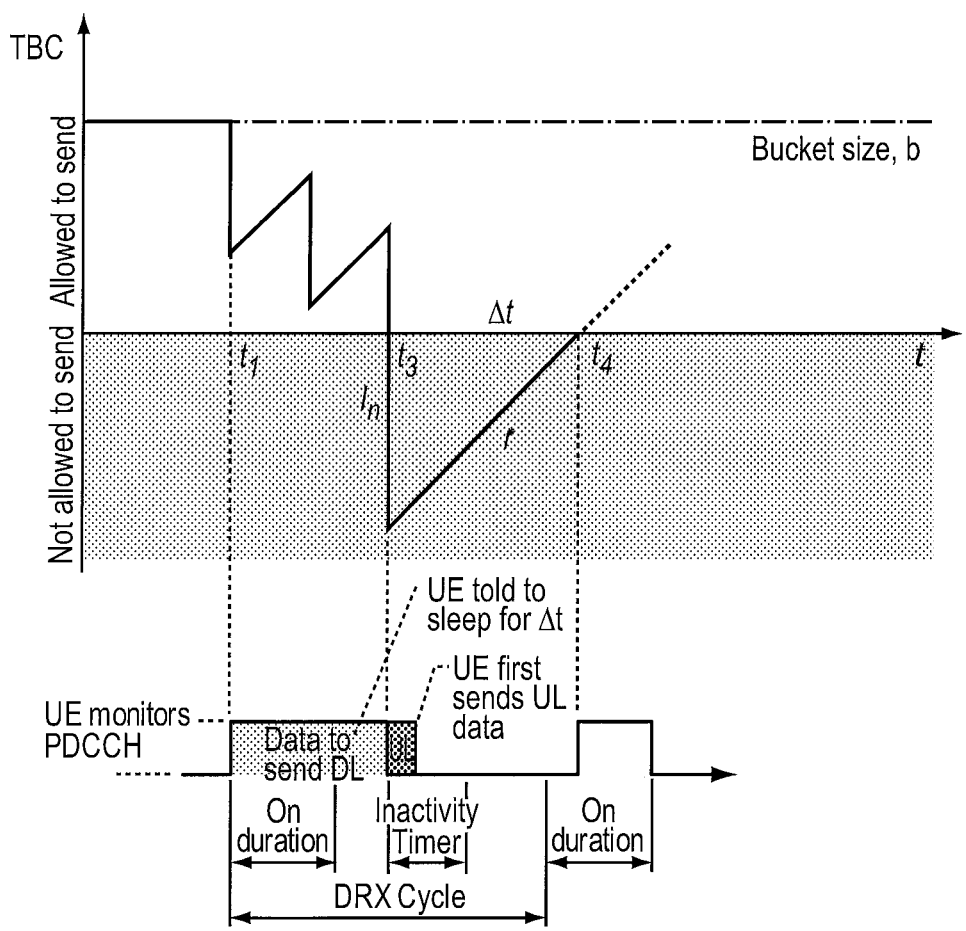
FIG. 12 depicts the relationship between the modified token bucket algorithm operation and DRX operation when a UE has uplink transmissions.

As depicted in FIG. 12, if the UE has data to send in the UL direction, it will monitor PDCCH in order to send that data and sleep for the remainder of Δt. This will allow, for example, Transmission Control Program (TCP) acknowledgements (ACKs) to be sent before sleeping. In this case, the UE monitors the PDCCH for the duration indicated, to receive scheduling grants.

Assume a TCP flow is rate shaped to a particular rate, called the shaping rate. The shaping rate will on average be the token rate. However, since TCP probes for more bandwidth, some packets have to be stored in the eNodeB. At most, around one Pipe Capacity worth of data will reside in the buffer. The Pipe Capacity (PC) or the bandwidth delay product (BDP) is defined as the bandwidth times the round trip time (RTT) for the flow: PC=R·RTT.

Figure 1:
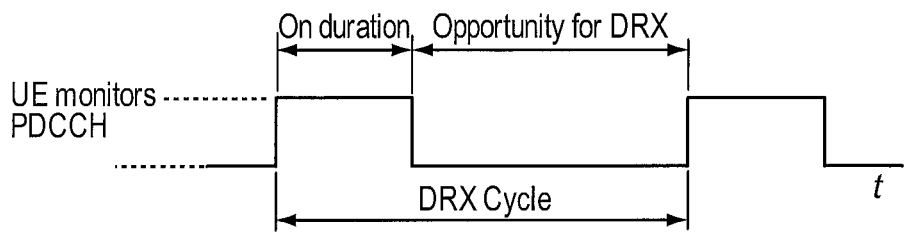
FIG. 1 is a timing diagram demonstrating DRX operation.
Figure 2:
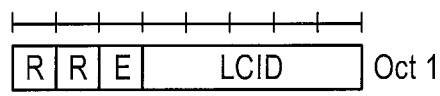
FIG. 2 is a diagram of a MAC subheader.
Figure 3:
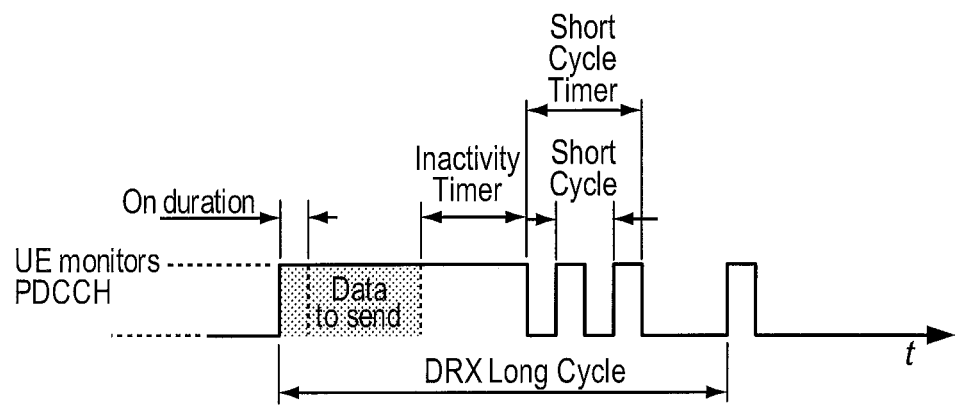
FIG. 3 is a detailed timing diagram of DRX operation.
Figure 4:
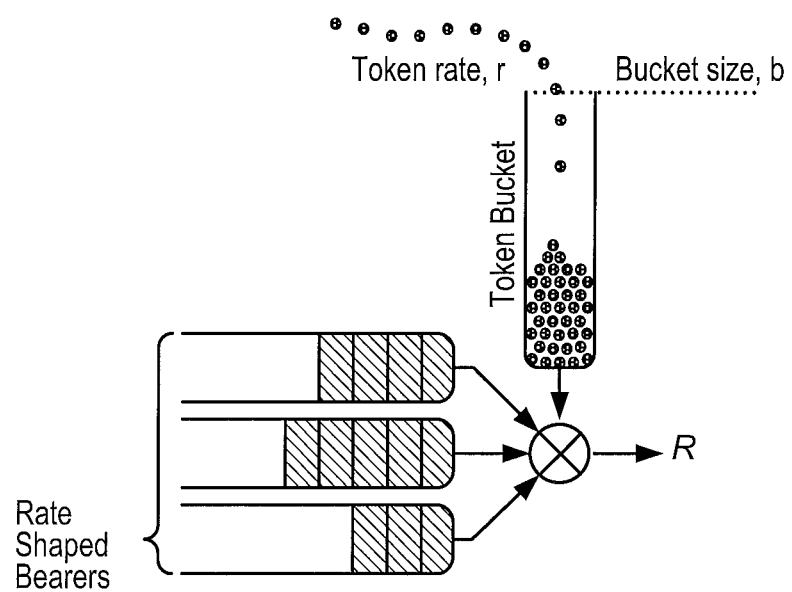
FIG. 4 is a functional block diagram of a conventional token bucket algorithm for a rate shaper.
Figure 5:
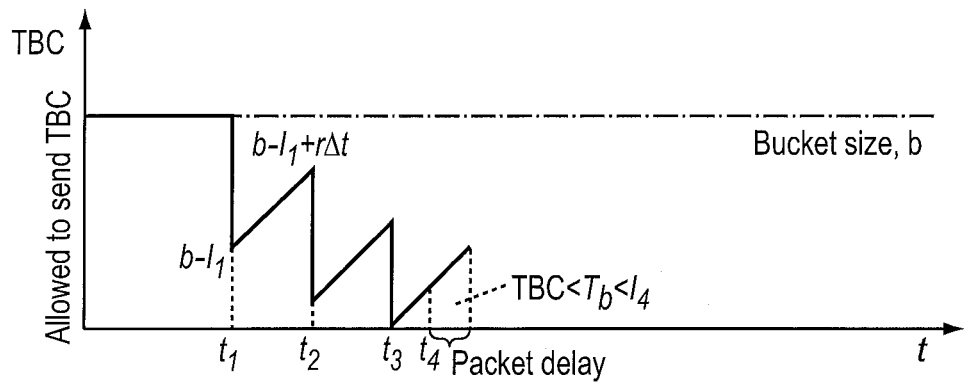
FIG. 5 is a graph depicting the operation of a conventional token bucket algorithm in a rate shaper.

For rate shaping, a parameter r is defined to be the rate at which the token bucket is refilled with tokens. On average, the flow will adapt to this rate, yielding the relation r=R (see FIG. 3). The time, Δt, in which the network is prohibited to send traffic to the UE is then $$\Delta t = \frac{PC}{r} = \frac{R \cdot RTT}{r} = RTT,$$

that is, the maximum time that the UE does not receive data is one RTT. Note also that the time is independent of the token rate and the current bitrate. The round trip time is on the order of tenths or even hundreds of milliseconds; for example, RTT can be within the range 40 ms to 400 ms.

The buffer size will be at most the minimum age threshold of the Active Queue Management algorithm in the eNodeB, regardless of the actual RTT. This minimum age threshold has the default value 200 ms. The RTT may be substituted for the minAgeThreshold, here denoted by $t_{min}$, so $\Delta t = t_{min}$. This is the maximum amount of data that can be sent. In practice, the rate is limited by the cell peakrate in each TTI. Accordingly, $$\Delta t = \min\left(t_{min}, \frac{R \cdot 10^{-3}}{r}\right),$$

where R is the peak rate and r is the token rate. The peak rate R is multiplied by 1 millisecond to give the maximum number of bits that can be transferred in one TTI.

T is defined as the duration that no data is sent, even if allowed. The following relationships apply:

$$0 \le T \le \frac{R \cdot 10^{-3}}{r}, \quad 0 \le \Delta t \le \frac{R \cdot 10^{-3}}{r}, \text{ and } T + \Delta t = \frac{R \cdot 10^{-3}}{r}.$$

The value of T will affect the potential duration of DRX mode since $$\Delta t = \frac{R \cdot 10^{-3}}{r} - T.$$

T has been found from simulations to be a few milliseconds.

Figure 13:
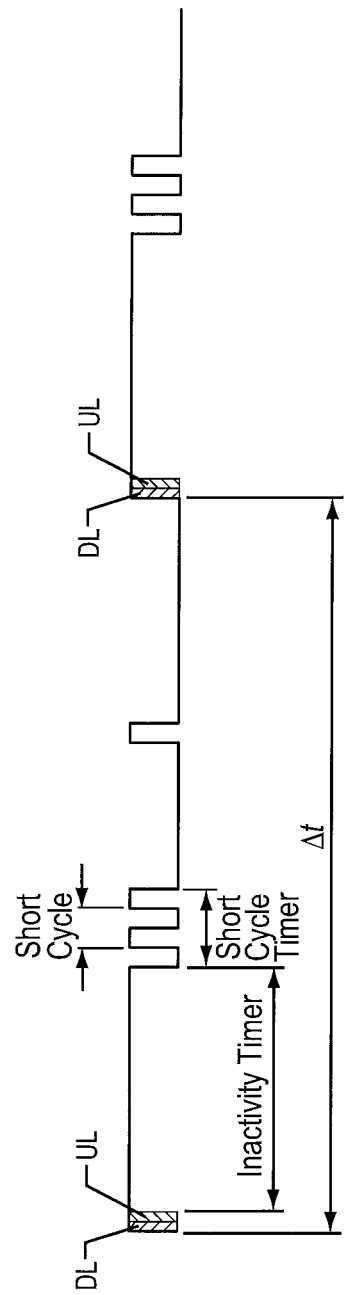
FIG. 13 is a timing diagram depicting prior art DRX operation requiring the UE to monitor PDCCH for data.

The following example illustrates the battery power savings of embodiments of the present invention, in the case when Δt is 120 ms, i.e., three DRX long cycles $t_c$. The "on" duration $t_{on}$ is 2 ms. The inactivity timer value $t_{inactive}$ is 40 ms. FIG. 13 depicts the prior art situation, wherein the UE is awake during three DRX cycles, $4t_{on} + t_{inactive}$. The awake ratio is $$\frac{4t_{on} + t_{inactive}}{3t_c}.$$

In contrast, FIG. 10 depicts the situation when embodiments of the present invention are applied. In the DRX Short cycle, data is sent first in DL and then in UL, taking 2 ms in total. The DL rate shaping function triggers after sending the DL data and the UE sleep period is triggered. The UE however has UL data to send and does this before sleeping for the remainder of Δt. The inactivity timer is bypassed, resulting in lower battery power consumption. Note that the UE sleep period may be triggered either once or at every "on" duration start. In this case, the UE is awake during three DRX cycles, $t_{on}$. The awake ratio is $$\frac{t_{on}}{3t_c}.$$

By allowing the UE to go into the DRX short cycle, almost the same performance can be achieved without the need to alter system standards. FIG. 11 depicts an example using a DRX short cycle timer of 2 DRX short cycles. In this case, the UE is awake during three DRX cycles $3t_{on}$. The awake ratio is $$\frac{3t_{on}}{3t_c}.$$

The amount of battery power saved is thus dependant on the DRX settings and Δt. In this case when Δt is 120 ms, $t_c$ and $t_{inactive}$ are 40 ms, and $t_{on}$ is 2 ms, the savings is $(3t_{on}+t_{inactive})$ on average per three DRX cycles. That is, $$\frac{4t_{on} + t_{inactive} - t_{on}}{4t_{on} + t_{inactive}} \approx 0.96$$

In embodiments that do not require any changes to the system standards, $$\frac{4t_{on} + t_{inactive} - 3t_{on}}{4t_{on} + t_{inactive}} \approx 0.88$$

Figure 14:
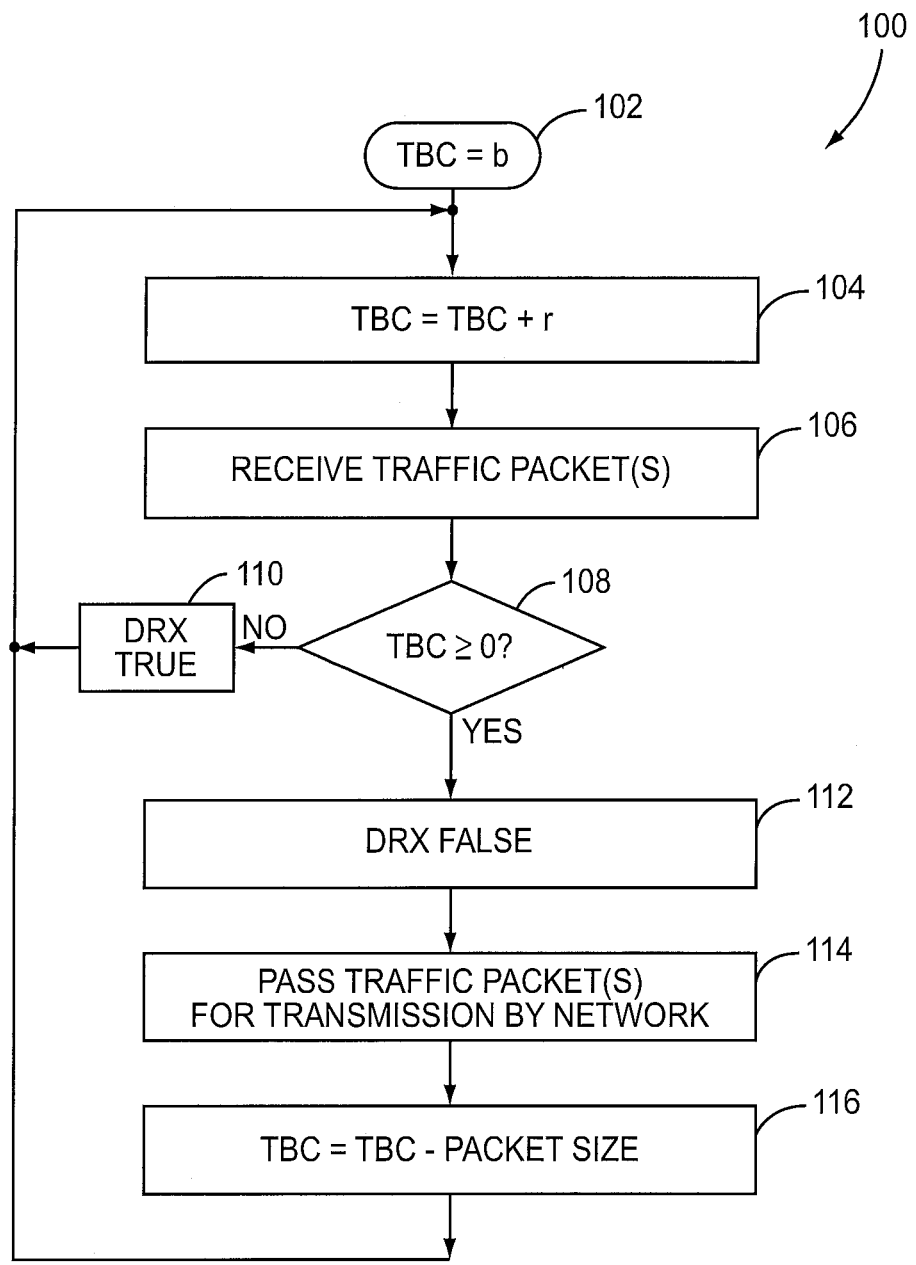
FIG. 14 is a flow diagram depicting the DRX algorithm according to embodiments of the present invention.

FIG. 14 depicts a method 100 of controlling DRX in a UE based on a modified token bucket rate shaping algorithm for the downlink. Initially, the Token Bucket Counter (TBC) is set to b (block 102) representing the maximum number of tokens it can hold. The TBC is incremented at a constant token rate r (block 104). The increase in TBC is depicted as a discrete block 104; however, those of skill in the art will recognize that the TBC is incremented at a constant rate, regardless of the flow of control through the flow diagram of FIG. 14. In one embodiment, for example, the TBC is incremented each TTI. The rate shaper receives one or more data packets of user traffic (block 106). If the TBC is greater than or equal to zero (block 108), the packets are deemed conformant and passed on for transmission by the network (block 114), and the TBC is decremented by the packet size (block 116). In this case, DRX is disabled at the UE (block 112), if necessary. As noted above, this may create a negative value in the TBC, representing "borrowed" tokens. If one or more traffic packets are received (block 106) and the TBC is negative (block 108), the packets are withheld from transmission. Since no user traffic is to be transmitted on the downlink, a DRX command is sent to the UE (block 110), such as in a MAC Control Element, directing the UE to a sleep mode to conserve battery power.

Those of skill in the art will readily recognize that a rate shaper implementing the method 100 may be implemented in dedicated hardware, programmable logic with appropriate firmware, software executing on a controller or processor (e.g., a Digital Signal Processor, or DSP), or any combination thereof. Such firmware or software may be stored on non-transient computer-readable media, such as solid-state memory (e.g., Flash RAM, DRAM, ROM, or the like), magnetic or optical media, or the like. The firmware or software may be accessed by a controller or processor directly, via a controller such as a memory controller or disc drive controller, or across a wired or wireless network from remote computer readable media.

In a first embodiment described herein, the inactivity timer is bypassed, allowing the UE to save battery power. This embodiment requires changes to the system operating standards, but offers the best performance.

A second embodiment described herein does not disturb the DRX cycle, but does not save as much battery power as the first embodiment. The inactivity timer is bypassed completely. This embodiment does not require any changes to the system operating standards.

A third embodiment described herein allows the UE to sleep through several "on" durations, but requires changes to the system operating standards. Alternatively, the UE can be triggered once for each "on" duration—a solution not requiring any changes to the system operating standards. This embodiment yields a good performance increase without too much effort.

By utilizing DRX functionality, it is possible to extend the UE's battery life time by periodically switching off the UE transceiver in an organized manner. The modified DRX functionality disclosed herein makes use of information in the rate shaping mechanism to predict periods of inactivity, in order to save even more battery power. Although explained herein in detail with reference an embodiments implementing a modified token bucket algorithm with token borrowing, the present invention is not limited to such an embodiment. In general, UE battery life may be extended by activating DRX whenever a rate shaping mechanism is able to identify, or predict, a duration of non-transmission of data by the network.

As used herein, the following terms have the following defined meanings:

Rate enforcement: Rate enforcement is the umbrella term for rate shaping and rate policing.

Rate policing: The process of discarding packets from a traffic stream in accordance with a traffic profile is called rate policing or traffic policing. Reasons to apply rate policing can be to protect the network from flooding attacks, enable tiered subscriptions and discourage cheating, e.g., users upgrade the VoIP codec rate beyond that which has been authorized by the network.

Rate shaping: The process of delaying packets in a traffic stream to cause it to conform to some defined traffic profile is called rate shaping or traffic shaping. Reasons to apply rate shaping can be to smooth out traffic in time entering a network. The reasons to apply rate policing are valid also here. Rate shaping can be realized as an improvement to the scheduler.

Shaping rate: The rate resulting from the use of a rate shaper with a certain token rate. The shaping rate should on average be the token rate.

Traffic policing: See rate policing.

Traffic shaping: See rate shaping.

Token: Something serving as an expression of something else. Here a token is virtual sign corresponding to the smallest information unit size. Tokens arrive into the bucket at the token rate, r.

Token rate: The rate at which tokens are injected into the system.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling discontinuous reception (DRX) in user equipment (UE) based on rate shaping by a wireless communication network, comprising:
  rate shaping traffic transmitted by the network using a modified token bucket rate shaping algorithm comprising:
    maintaining a token bucket counter (TBC) representing the number of tokens in a bucket;
    decreasing the TBC by the size of each packet passed for transmission by the network;
    increasing the TBC at a constant token rate;

determining whether the TBC is positive or negative, wherein the duration the TBC is negative is the negative TBC value divided by the token rate; and if the TBC is positive, passing a data packet for transmission by the network; and if the TBC is negative, withholding a data packet from transmission by the network; and if the TBC is negative, directing a UE to enter a DRX mode in which the UE does not monitor a downlink control channel for downlink traffic for the duration the TBC is negative.

2. The method of claim 1 wherein the network directs the UE to enter DRX mode upon the TBC assuming a negative value, and to remain in DRX mode until the expiration of the current UE DRX long cycle.

3. The method of claim 2 wherein the UE begins monitoring a downlink control channel for downlink traffic following the expiration of the current UE DRX long cycle, but wherein no downlink traffic is transmitted by the network until the TBC assumes a non-negative value.

4. The method of claim 1 further comprising communicating to the UE the duration the TBC is negative.

5. The method of claim 4 wherein communicating to the UE the duration the TBC is negative comprises communicating the duration in a MAC Control Element.

6. The method of claim 1 wherein the network directs the UE to enter DRX mode for the duration of one or more DRX long cycles.

7. The method of claim 6 wherein communicating to the UE the number of DRX long cycles comprises communicating the number of DRX long cycles in a MAC Control Element.

8. The method of claim 6 wherein the network directs the UE to enter DRX mode separately for each of two or more DRX long cycles.

9. The method of claim 6 further comprising communicating to the UE the number of DRX long cycles during which the UE shall remain in DRX mode.

10. A method of controlling discontinuous reception (DRX) in user equipment (UE) based on rate shaping by a wireless communication network, comprising:

rate shaping traffic transmitted by the network using a modified token bucket algorithm yielding known or calculable durations during which the network withholds traffic from transmission to a UE, the algorithm comprising maintaining a token bucket counter (TBC) representing the number of tokens in a bucket;

decreasing the TBC by the size of each packet passed for transmission by the network;

increasing the TBC at a constant token rate;

if the TBC is positive, passing a data packet for transmission by the network; and if the TBC is negative, withholding a data packet from transmission by the network; and directing the UE to enter a DRX mode in which the UE does not monitor a downlink control channel for downlink traffic during the duration of withholding traffic from transmission, and for the duration required to achieve a non-negative TBC at the constant token rate.

11. A non-transient computer-readable medium which stores computer-executable process steps for controlling discontinuous reception (DRX) in user equipment (UE) based on rate shaping by a wireless communication network, the computer-executable process steps causing a controller to perform the steps of:

rate shaping traffic transmitted by the network using a modified token bucket rate shaping algorithm comprising maintaining a token bucket counter (TBC) representing the number of tokens in a bucket;

decreasing the TBC by the size of each packet passed for transmission by the network;

increasing the TBC at a constant token rate;

if the TBC is positive, passing a data packet for transmission by the network; and if the TBC is negative, withholding a data packet from transmission by the network; and if the TBC is negative, directing a UE to enter a DRX mode in which the UE does not monitor a downlink control channel for downlink traffic for the duration the TBC is negative; and communicating to the UE the duration the TBC is negative.

12. The computer-readable medium of claim 11 wherein communicating to the UE the duration the TBC is negative comprises communicating the duration in a MAC Control Element.

13. The computer-readable medium of claim 11 wherein the network directs the UE to enter DRX mode upon the TBC assuming a negative value, and to remain in DRX mode until the expiration of the current UE DRX long cycle.

14. The computer-readable medium of claim 11 wherein the network directs the UE to enter DRX mode for the duration of one or more DRX long cycles.

15. A wireless communication network node, comprising:

a rate shaper operative to limit data transmitted by the network using a modified token bucket rate shaping algorithm comprising maintaining a token bucket counter (TBC) representing the number of tokens in a bucket;

decreasing the TBC by the size of each packet passed for transmission by the network;

increasing the TBC at a constant token rate;

if the TBC is positive, passing a data packet for transmission by the network; and if the TBC is negative, withholding a data packet from transmission by the network; and a controller operative to direct User Equipment (UE) to enter a DRX mode in which the UE does not monitor a downlink control channel for downlink traffic upon the TBC assuming a negative value, and to remain in DRX mode until the expiration of the current UE DRX lonq cycle.

16. The network node of claim 15 wherein the controller is operative to direct the UE to enter DRX mode for the duration the TBC is negative.

17. The network node of claim 15 wherein the controller is operative to communicate to the UE the number of DRX long cycles during which the UE shall remain in DRX mode.

18. The network node of claim 15 wherein the controller is operative to direct the UE to enter DRX mode for the duration of one or more DRX long cycles.

* * * * *